United States Patent [19]

Mears et al.

[11] E Re. 29,155

[45] Reissued Mar. 22, 1977

[54] ON-OFF SPRINKLER

[75] Inventors: James W. Mears, Warwick; William J. O'Brien, Barrington, both of R.I.

[73] Assignee: Grinnell Fire Protection Systems Company, Inc., Providence, R.I.

[22] Filed: Sept. 3, 1975

[21] Appl. No.: 610,013

Related U.S. Patent Documents

Reissue of:

[64] Patent No.: 3,757,866
Issued: Sept. 11, 1973
Appl. No.: 196,641
Filed: Nov. 8, 1971

[52] U.S. Cl. ..... 169/37; 239/75; 239/569; 137/457; 169/60

[51] Int. Cl.² ..... A62C 37/08

[58] Field of Search ..... 169/19, 37, 56, 60, 169/90; 137/457; 239/569, 75

[56] References Cited

UNITED STATES PATENTS

| | | | |
|---|---|---|---|
| 917,292 | 4/1909 | Hankee et al. | 169/37 |
| 1,241,209 | 9/1917 | Grinnell | 169/20 |
| 1,826,088 | 10/1931 | Ostlind | 169/37 |
| 1,913,035 | 6/1933 | Loepsinger | 169/37 |
| 2,101,338 | 12/1937 | Lovekin | 169/37 |
| 2,230,179 | 1/1941 | Cid | 169/37 |
| 2,647,017 | 7/1953 | Coulliette | 169/37 |
| 3,698,483 | 10/1972 | Martin et al. | 169/37 |

*Primary Examiner*—Robert S. Ward, Jr.

[57] ABSTRACT

An improved sprinkler for a fire protection sprinkler system in which the sprinkler opens to discharge water at one temperature and closes to stop the flow of water at a lower temperature. A pilot valve is actuated by a bimetal disc which also resiliently biases the pilot valve in a closed position. The bimetal disc has a snap action resulting in better control of the "on" and "off" temperatures of the sprinkler. A thermal delay for closing is obtained by the hysteresis which is designed into the bimetal disc.

7 Claims, 3 Drawing Figures

ON-OFF SPRINKLER

Matter enclosed in heavy brackets[ ] appears in the original patent but forms no part of this reissue specification; matter printed in italics indicates the additions made by reissue.

BRIEF SUMMARY OF THE INVENTION

Conventional sprinklers for fire sprinkler systems are single operation devices wherein a heat responsive member releases a plug which is positioned to prevent the flow of water from the sprinkler. When the plug is released, water flows against a deflector which disperses the water in a desired pattern. Such a sprinkler must be replaced after a fire and the entire sprinkler system must be shut off to replace the sprinkler.

Many attempts have been made to produce a sprinkler which would shut itself off after a fire is extinguished. Such a sprinkler would conserve water because the flow of water is shut off, and it would be ready to operate immediately if the fire should start up again. In one design a fluid balanced piston valve is utilized to control flow of the extinguishing fluid from the sprinkler. A pilot valve controls the fluid balance and, thus, the position of the piston valve in either an open or a closed position. The pilot valve in turn is positioned by a leaf bimetal member which is responsive to atmospheric temperature. (See U.S. Pat. No. 917,292.)

The present invention provides an improved pilot valve arrangement in which a bimetal snap disc is used to position the pilot valve. The bimetal disc is positioned to load or resiliently bias the pilot valve toward a closed position. A hysteresis is built into the disc and is utilized to move the pilot valve to its closed position at a temperature lower than that at which the pilot valve is moved to an open position. With this built-in thermal delay, the sprinkler is not shut off until the surrounding temperature is low enough to assure that the fire is out.

An object of the present invention is to provide an improved on-off sprinkler having a fluid balanced main valve and a pilot valve for controlling the fluid balance on the main valve, in which the operating temperature of the sprinkler is controlled to close tolerances for both an "on" operation and an "off" operation.

Another object is to provide an improved on-off sprinkler in which the pilot valve is moved with a snap action.

Another object is to provide an improved on-off sprinkler in which the pilot valve is resiliently biased in a closed position at temperatures below a predetermined operating temperature by a bimetal disc.

Another object is to provide an improved on-off sprinkler which opens at one predetermined temperature and closes at a second, lower predetermined temperature.

Other advantages and features of the invention will be apparent from the following description and accompanying drawings.

Figure 1:
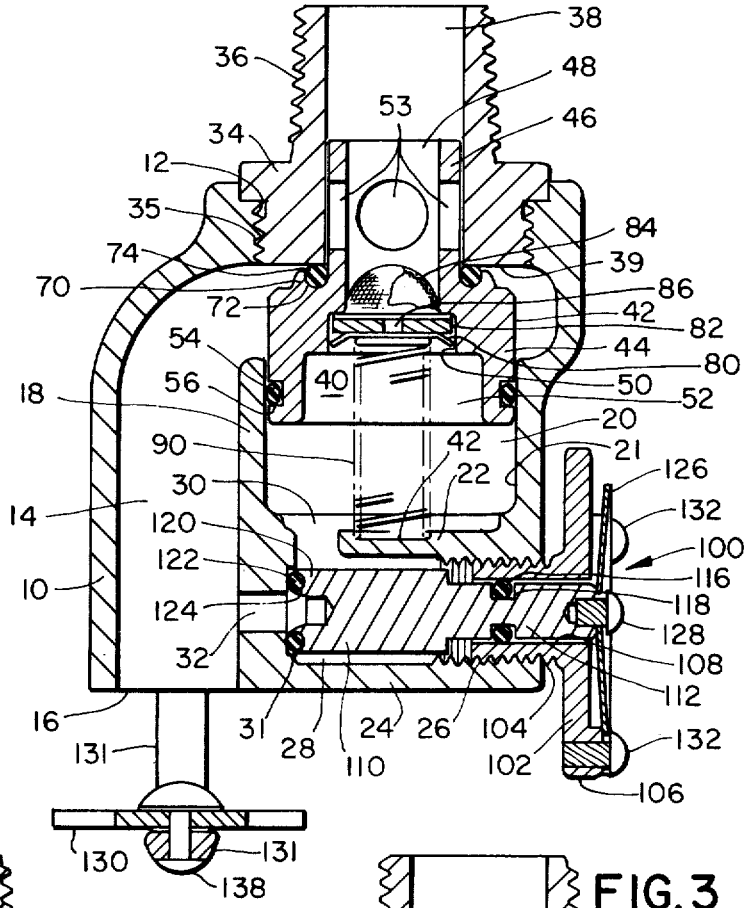
FIG. 1 is a sectional, front view of an on-off sprinkler embodying the present invention, in which the sprinkler is shown in an "off" position.

Referring first to FIG. 1, the improved sprinkler embodying the present invention is shown in a pendent position. The sprinkler has a body 10 defining a circular, threaded opening 12, a flow passage 14, and an outlet 16, spaced from the opening 12. The body 10 is preferably formed by a casting of a suitable material such as bronze. An inner wall 18 cooperates with an inner wall 22 and the outer wall of the body 10 to define a cylindrical chamber 20, the axis of which passes through the center of the threaded opening 12. The threaded opening 12 has a diameter which is at least as great as the diameter of the cylindrical chamber 20. The second inner wall 22, which is positioned at the lower end of the chamber 20, cooperates with a lower wall 24 of the body 10 to define a threaded opening 26 and a chamber 28. The chamber 28 is aligned with a passage 30 and communicates through the passage 30 with the chamber 20 and the chamber 28 communicates with the flow passage 14 through a passage 32 in the wall 18. The cylindrical surface 21 of the chamber 20 is finished smooth, and a smooth seating surface is formed on the area 31 of the wall 18 surrounding the entrance to the passage 32.

An inlet member 34 has an externally threaded end 35 which mates with the threaded opening 12 to secure the inlet member 34 in the opening 12 of the body 10. A second externally threaded end 36 is of a size which is suitable for connecting the sprinkler to a sprinkler piping system.

The inlet member 34 further has a cylindrical passage 38 which provides an axial passage for fluid through the inlet member to the flow passage 14. The diameter of the flow passage 38 is less than the diameter of the chamber 20. An annular surface 39 at the inner end of the inlet member 34 is smooth and functions as a seating surface, as will be explained hereinafter.

A piston assembly 40 is received in the chamber 20, and closes the upper end of the chamber 20. The piston assembly 40 comprises a piston 42 having a first cylindrical portion 44 and a second, smaller cylindrical portion 46. An axial bore 48 through the second cylindrical portion 46 and axial counterbores 50 and 52 in the first cylindrical portion 44 provides a passage axially through the piston 42.

The first cylindrical portion 44 of the piston 42 has a diameter which is sized to be slideably received in the passage 20 of the inlet member 34. The second cylindrical portion 46 of the piston 42 has a diameter which is sized to be slideably received in the cylindrical chamber 38. In this manner, the piston 42 is mounted for axial movement toward and away from the inlet member 34. The second cylindrical portion is provided with ports 53 positioned to permit a fluid to pass from the axial passage 38 to the flow passage 14 only when the piston 42 is positioned in its lower position of travel.

An O-ring 54 in a groove 56 in the outer surface of the first cylindrical portion 46 prevents fluid flow through the annular space between the wall 21 and the first cylindrical portion 44.

An annular lip 70 projects from the surface which connects the outer surface of the first and second cylindrical portion 46 to form, with the cylindrical portion 46, an annular groove 72. This groove 72 receives an O-ring 74 which engages and seats against the surface 39 of the inlet member 34 when the piston 42 is moved axially toward the inlet member to provide a fluid seal.

A restriction member 82 and a strainer 84 are secured in the counterbore 50 of the piston 42 by a retaining ring 80. The restriction member 82 has an orifice 86 to control fluid flow from the inlet port to the chamber 20. The strainer 84 will prevent the obstruction of the orifice 86 by foreign materials which may enter the sprinkler from the sprinkler system to which the sprinkler is connected. The strainer 84 has a domed portion to provide an increased area and flow passages through the strainer. Both strainer 84 and the restriction member 82 are formed of non-corrosive materials such as brass or bronze.

A coil spring 90 is positioned between the retaining ring 80 and the inner wall 22 to provide a resilient bias to the piston 40 toward the inlet member 34. The lower end of the spring 90 fits into a recess 92 in the wall 22 to keep the spring in position.

It will be noted that the area of the piston assembly 40, which can be acted on by fluid pressures in the passage 38, is considerably less than the area of the piston assembly which can be acted on by fluid pressures in the chamber 20, so that when the inlet fluid pressure and the fluid pressure in the chamber 20 are equal, the balance of fluid pressures will hold the piston 42 in its closed position.

In accordance with the present invention, an improved pilot valve assembly 100 is provided for controlling fluid flow from the chamber 20, the passage 30, the chamber 28, and through the passage 32 to the flow passage 14. The pilot valve assembly 100 comprises a retainer member 102 having an externally threaded cylindrical portion 102 which is of a suitable size for engaging the threads of the threaded opening 26 of the body 10. The retainer member 102 has a radial flange portion 106 which is positioned a short distance away from the body 10 when the retainer member 102 is threaded into the opening 26. A bore 108 extends axially through the retainer member 102.

A pilot valve 110 having a cylindrical portion 112 fits loosely for axial movement in the bore 108 and in the cavity 28. An O-ring 116 fits in a recess 118 in the outer surface of the cylindrical portion 112 to provide a fluid seal between the cylindrical portion 112 and the surface of the bore 108.

The valve 110 has an axial length which permits the inner end 120 to touch the seat surface 31 surrounding the passage 32. An O-ring 122 in an annular groove 124 in the surface of the end 120 provides a fluid seal with the seat surface 31 when the valve 110 is urged axially thereof toward the seat surface 31.

A bimetal disc 126 is centrally connected to the outer end of the valve 110 by a drive screw 128 which passes through a central opening in the disc 126 and into a drilled hole in the outer end of the valve 110. The edges of the disc 126 are secured to the radial flange 106 by drive screws 132. Preferably, the area of contact of the drive screws 132 with the bimetal disc is held to a minimum so that heat flow from the bimetal disc 126 to the flange 106 is at a minimum. A thermal insulator (not shown) could be installed between the contact points of the disc with the drive screws 132, if desired.

A conventional deflector 130 is spaced from the outlet 16 of the flow passage 14 and perpendicular to the projected axis of the flow passage 14 by a yoke 131 which is generally U-shaped.

Figure 3:
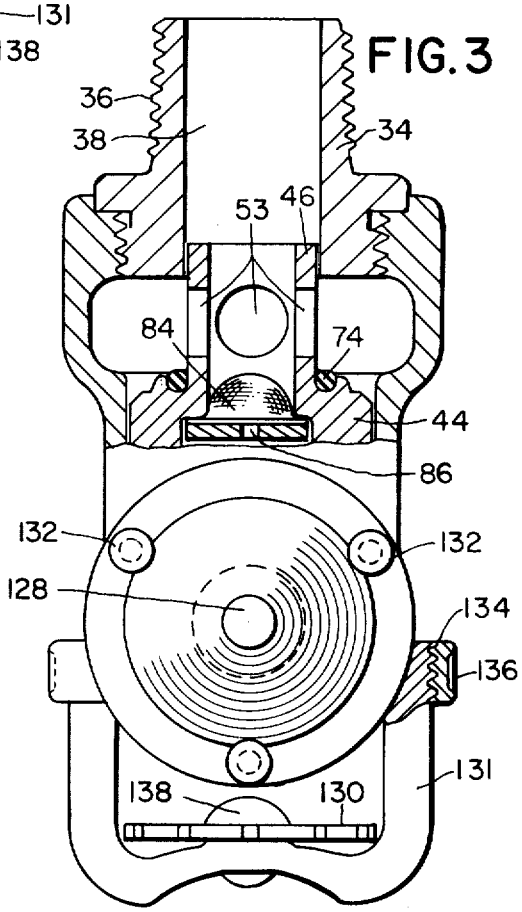
FIG. 3 is a partially sectioned right side view of the sprinkler shown in FIG. 2.

The free ends of the yoke 131 are serrated and secured in openings 134 which are drilled therefor in the body 10 by swaging, as at 136, the body 10 against the serrations, as seen in FIG. 3. The deflector 130 is secured to the yoke 131 by a rivet 138.

In accordance with the present invention, the bimetal disc 126 is cupped and is designed to move with a snap action toward a reverse cup shape at one temperature, for example 185° F, and when in the reversed shape, to return to its original shape at a second, lower temperature, for example 100° F. Further, the bimetal disc 126 is positioned with its concave surface facing the pilot valve 110 and is urged against the valve 110 to resiliently bias the valve 110 toward its closed position.

To compensate for the stress loading of the bimetal disc 126, a temperature rating is selected for the bimetal disc 126 which is higher than the desired operating temperature. In order to position the pilot valve assembly 100 in the body 10, to provide a resilient bias on the valve 110 and to obtain operation of the pilot valve at a desired temperature, the assembly 100 and the body 10 are put in a heated environment at the desired operating temperature of the sprinkler. The retainer member 102 is threaded into the opening 26 and tightened until the O-ring 122 is pressed against the seating surface 31 with sufficient pressure at the desired operating temperature of the sprinkler to cause the bimetal disc 126 to snap to the position to open the pilot valve. The pilot valve assembly is now installed in its proper position with the desired bias provided by the bimetal disc 126.

An anaerobic plastic, such as "Loctite" No. 70, is applied to the threads of the retainer member 70 prior to its being put in the heated oven for installation. This anaerobic plastic will harden to lock the threads in this position.

It will be recognized that the pilot valve 110 can be resiliently biased toward its closed position by a separate spring and that it is not necessary to obtain the bias from the bimetal disc 126.

In operation, the sprinkler is installed in a sprinkler system in pendent position. When the water is turned on, water flows into the passage 38, the axial bore 48, through the strainer 84 and the orifice 86 in the restriction member 82, to fill the chambers 20 and 28. The pilot valve 110 is held in a closed position by the resilient force of the bimetal disc 126 so that no water discharges through the passage 32. When the chambers 20 and 28 have filled with water, equal fluid pressure is established above and below the piston 42.

Because the area of the piston assembly 40 which is exposed to fluid pressure in the chamber 20 is greater and produces a greater force on the assembly 40 tending to move the piston assembly axially toward the inlet member 34 than the area and the force which is produced by the fluid tending to move the piston assembly 40 axially away from the inlet member 34, the O-ring 74 is pressed tightly against the surface 39 to close the sprinkler.

Figure 2:
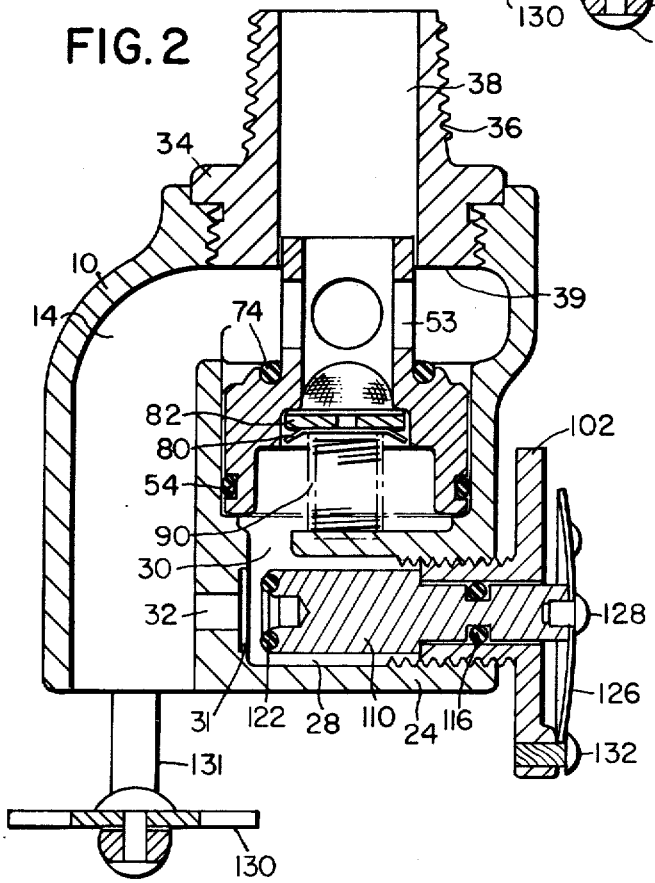
FIG. 2 is a sectional, front view of the sprinkler shown in FIG. 1, in which the sprinkler is shown in an "on" position.

In the event of a fire, the temperature surrounding the bimetal disc 126 will rise. As the bimetal disc 126 reaches its operating temperature, the disc snaps to a reverse cup shape, moving the pilot valve 110 with it and moving the O-ring 122 off its seat 31. Immediately water discharges from the chamber 28, through the passage 32, thereby lowering the pressure sufficiently in the chamber 20 so that its force against the area of the piston assembly 40 becomes less than the force of fluid in the inlet member. Restriction member 82 prevents fluid pressure from building up in chamber 20. At a point, the fluid pressure against the top of the piston assembly is sufficient to overcome the force of the spring 90 causing piston assembly 40 to move axially downward to an open position, as shown in FIG. 2.

With the piston assembly in this position water flows through ports 53, and along the flow passage 14 to discharge against the deflector 130. As the deflector is below the bimetal disc 126 with the sprinkler in a pendent position, the discharging water will not cool the bimetal disc 126 as long as the fire continues to burn.

After the fire is extinguished, the bimetal disc 126 cools and, upon reaching its lower operating temperature, snaps to its original position to move the pilot valve 110 to a position to close the passage 32. As the chambers 28 and 20 fill with water, the pressure in the chamber 20 increases until it produces a force which moves the piston assembly 40 axially toward the inlet member 34 to stop further flow through the sprinkler.

The invention is not intended to be limited to the particular embodiments thereof illustrated and described above, but only by the following claims and their equivalents.

We claim:

1. A water sprinkler device for a fire protection system coupled to a pressurized fluid supply line; comprising in combination:

a sprinkler body having an annular inlet portion adapted for coupling to said fluid supply line;

means providing an inner wall for dividing said sprinkler body into a first bifurcation, having an outlet portion that defines a main fluid flow passageway between said inlet portion and said outlet portion, and a second bifurcation that defines a control chamber;

a deflector mounted adjacent said outlet portion to deflect fluid flow therethrough;

means providing a valve seating surface abutting said inlet portion at the junction of said bifurcations;

a main valve disposed in a direction downstream from said seating surface and having a valve seat mounted in opposed relation to said seating surface so as to oppose fluid pressure from said inlet portion that tends to cause said valve seat to separate from said seating surface to open said valve;

said main valve being slideable into said control chamber for controlling fluid flow through said main passageway while maintaining said control chamber blocked to fluid flow from said outlet portion;

an aperture formed substantially centrally in said main valve to define a control passageway that couples fluid from said inlet portion to said control chamber;

said main valve exhibiting a first surface area disposed toward said control chamber that is greater than a second surface area disposed toward said inlet portion to provide a greater main valve closing pressure than opening pressure;

means providing an outlet port from said control chamber to release fluid pressure therefrom to open said main valve;

pilot valve means having a valve member mounted to control fluid flow through said outlet port and including a bimetallic disc centrally connected to said valve member, and means for securing the peripheral edges of said bimetallic disc against movement relative to said sprinkler body so as to flex said disc in a manner to resiliently bias said valve member to close said outlet port, said disc responding to temperature rise to snap to an opposite flexure to open said outlet port to release fluid from said control chamber to open said main valve.

2. The combination in accordance with claim [ 4 ] *1* wherein said bimetallic disc exhibits a hysteresis effect wherein said disc flexes in one direction to open said pilot valve means upon the occurrence of a first predetermined temperature but flexes in the reverse direction to close said pilot valve means upon the occurrence of a second temperature lower than said first predetermined temperature.

*3. A water sprinkler device for a fire protection system coupled to a pressurized fluid supply line; comprising in combination:*

*a sprinkler body having an annular inlet portion adapted for coupling to said fluid supply line;*

*means providing an inner wall for dividing said sprinkler body into a first bifurcation, having an outlet portion that defines a main fluid flow passgeway between said inlet portion and said outlet portion, and a second bifurcation that defines a control chamber;*

*a deflector mounted adjacent said outlet portion to deflect fluid flow therethrough;*

*means providing a valve seating surface abutting said inlet portion at the junction of said bifurcations;*

*a main valve disposed in a direction downstream from said seating surface and having a valve seat mounted in opposed relation to said seating surface so as to oppose fluid pressure from said inlet portion that tends to cause said valve seat to separate from said seating surface to open said valve,*

*said main valve being slideable into said control chamber for controlling fluid flow through said main passageway while maintaining said control chamber blocked to fluid flow from said outlet portion,*

*an aperture formed substantially centrally in said main valve to define a control passageway that couples fluid from said inlet portion to said control chamber;*

*said main valve exhibiting a first surface area disposed toward said control chamber that is greater than a second surface area disposed toward said inlet portion to provide a greater main valve closing pressure than opening pressure,*

*means providing an outlet port from said control chamber to release fluid pressure therefrom to open said main valve,*

*pilot valve means having a valve member mounted to control fluid flow through said outlet port and including a bimetallic disc operatively connected to said valve member,*

*said disc responding to temperature rise to snap in a direction to open said outlet port to release fluid from said control chamber to open said main valve.*

*4. The combination in accordance with claim 3, wherein said bimetallic disc exhibits a hysteresis effect wherein said disc flexes in one direction to open said pilot valve means upon the occurrence of a first predetermined temperature but flexes in the reverse direction to permit closing of said pilot valve means upon the occurrence of a second temperature lower than said first predetermined temperature.*

*5. The combination in accordance with claim 3, wherein the bimetallic disc is mounted externally of the sprinkler body and at a position above the deflector, whereby the disc is exposed to ambient temperature and does not come into contact with discharge fluid.*

*6. The combination in accordance with claim 3, wherein the pilot valve means additionally comprises a retainer member having a radial flange portion spaced from the sprinkler body, said flange portion protects the disc from discharge fluid.*

*7. A water sprinkler device for a fire protection system coupled to a pressurized fluid supply line, comprising in combination:*

*a sprinkler body having an annular inlet portion adapted for coupling to said fluid supply line;*

*means providing an inner wall for dividing said sprinkler body into a first bifurcation, having an outlet portion that defines a main fluid flow passageway between said inlet portion and said outlet portion, and a second bifurcation that defines a control chamber;*

*a deflector mounted adjacent said outlet portion to deflect fluid flow therethrough;*

*means providing a valve seating surface abutting said inlet portion at the junction of said bifurcations;*

*a main valve disposed in a direction downstream from said seating surface and having a valve seat mounted in opposed relation to said seating surface so as to oppose fluid pressure from said inlet portion that tends to cause said valve seat to separate from said seating surface to open said valve,*

*said main valve being slideable into said control chamber for controlling fluid flow through said main passageway while maintaining said control chamber blocked to fluid flow from said outlet portion,*

*an aperture formed substantially centrally in said main valve to define a control passageway that couples fluid from said inlet portion to said control chamber;*

*said main valve exhibiting a first surface area disposed toward said control chamber that is greater than a second surface area disposed toward said inlet portion to provide a greater main valve closing pressure than opening pressure,*

*means providing an outlet port from said control chamber to release fluid pressure therefrom to open said main valve,*

*a pilot valve means for closing said outlet port; and*

*temperature responsive means for controlling the pilot valve means including a bimetallic disc which exhibits a hysteresis effect by flexing in one direction to open said pilot valve means and release fluid from said control chamber upon the occurrence of a first predetermined temperature and flexing in a reverse direction to allow closure of said pilot valve means upon occurrence of a second temperature lower than said first predetermined temperature.*

* * * * *